US006832202B1

United States Patent
Schuyler et al.

(10) Patent No.: US 6,832,202 B1
(45) Date of Patent: Dec. 14, 2004

(54) METHOD AND SYSTEM OF ROUTING REQUESTS FOR AUTHORIZED APPROVAL

(75) Inventors: Paula D. Schuyler, Plano, TX (US); David E. Stone, Frisco, TX (US); Marisa S. Tara, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 935 days.

(21) Appl. No.: 08/921,130

(22) Filed: Aug. 29, 1997

(51) Int. Cl.[7] .............................................. G06F 17/60
(52) U.S. Cl. ................... 705/8; 705/7; 705/38
(58) Field of Search ................................ 705/1, 7, 8, 9, 705/44, 26, 38; 395/683, 200.31, 200.32; 706/10, 42, 46, 48, 47

(56) References Cited

U.S. PATENT DOCUMENTS

| 5,276,901 | A | | 1/1994 | Howell et al. ............... 395/800 |
|---|---|---|---|---|
| 5,315,504 | A | * | 5/1994 | Lemble ....................... 364/400 |
| 5,335,346 | A | | 8/1994 | Fabbio ........................ 395/600 |
| 5,390,247 | A | * | 2/1995 | Fischer ........................ 713/176 |
| 5,410,646 | A | * | 4/1995 | Tondevold et al. .......... 707/507 |
| 5,469,576 | A | | 11/1995 | Dauerer et al. ............. 395/186 |
| 5,678,041 | A | | 10/1997 | Baker et al. ................. 395/609 |
| 5,694,590 | A | | 12/1997 | Thuraisingham et al. ... 395/600 |
| 5,701,453 | A | | 12/1997 | Maloney et al. ............ 395/602 |
| 5,701,484 | A | * | 12/1997 | Artsy .......................... 395/683 |
| 5,720,033 | A | | 2/1998 | Deo ............................ 395/186 |
| 5,729,734 | A | | 3/1998 | Parker et al. ................ 395/609 |
| 5,745,687 | A | * | 4/1998 | Randell ................... 395/200.31 |
| 5,758,327 | A | * | 5/1998 | Gardner et al. ............... 705/26 |
| 5,805,798 | A | * | 9/1998 | Kearns et al. ......... 395/185.01 |
| 5,826,268 | A | | 10/1998 | Schaefer et al. ............... 707/9 |
| 5,832,455 | A | * | 11/1998 | Hayashi et al. ................. 705/7 |
| 5,852,809 | A | * | 12/1998 | Abel et al. ..................... 99/299 |
| 5,870,733 | A | | 2/1999 | Bass et al. ...................... 707/2 |
| 5,987,422 | A | * | 11/1999 | Buzsaki ........................ 705/9 |

FOREIGN PATENT DOCUMENTS

| JP | 402187861 A | * | 7/1990 |

OTHER PUBLICATIONS

Meyer, Gary. "Visual guidance system steers Windows–based HRIS." HRMagazine, vol. 39, No. 2, pp. 37–40 dated Feb. 1994.
O'Connell, Sandra E. "Security for HR records." HRMagazine, vol. 39, No. 9, pp. 37–41 dated Sep. 1994.
"Tackling security issues: heterogeneous networks make database security a challenge." MIDRANGE Systems, vol. 7, No. 20, p. 34 dated Oct. 1994.
"Hired hand for HR Pros." Windows Magazine, vol. 6, No. 11, p. 188 dated Oct. 1995.
"Employease gives customers even greater control." Business Wire dated Sep. 1998.
"Employease—Technical White Paper." from Web site: www.eease.com (retrieved Mar. 12, 1999).

* cited by examiner

*Primary Examiner*—Romain Jeanty
(74) *Attorney, Agent, or Firm*—Baker Botts L.L.P.

(57) ABSTRACT

A method and system for routing requests for authorization may comprise automatically determining approvals required for authorization of a request (72). A valid agent to provide one of the approvals required for authorization of the request (72) may be automatically determined. The requests (72) may be automatically routed to the valid agent for approval. After approval, it may be automatically determined if the approvals required for authorization of the requests (72) have been obtained.

23 Claims, 3 Drawing Sheets

METHOD AND SYSTEM OF ROUTING REQUESTS FOR AUTHORIZED APPROVAL

RELATED APPLICATIONS

This application is related to copending U.S. patent application Ser. No. 08/921,128, entitled "METHOD AND SYSTEM OF DETERMINING ACCESS TO RECORDS OF MEMBERS OF A COMMUNITY," and U.S. patent application Ser. No. 08/930,433, entitled "METHOD AND SYSTEM OF PROVIDING ACCESS PRIVILEGES TO RECORDS OF MEMBERS OF A COMMUNITY."

TECHNICAL FIELD OF THE INVENTION

The present invention relates generally to the field of routing information in a computer system, and more particularly to a method and system of routing requests for authorized approval.

BACKGROUND OF THE INVENTION

Modern businesses often employ integrated computer systems to gather and record information from various departments and operations. Such integrated systems allow information to be efficiently shared between departments. Information collected may include accounting records, payroll records, personnel records, manufacturing records, and the like.

Integrated computer systems may employ a workflow application to allow authorized personnel in a hierarchical structure to approve requests routed to them. A hierarchical structure could be established as administrative, financial, etc. Such workflow applications generally route requests based on defined procedures that may vary based on departments, operations, and special circumstances. As a result, many workflow procedures must generally be specifically defined and maintained.

SUMMARY OF THE INVENTION

Accordingly, need has arisen in the art for improved routing of applications for approval. The present invention provides a method and system of routing requests for authorized approval that substantially reduce or eliminate problems associated with prior systems and methods as well as improving the movement of work by automating manual tasks.

In accordance with the present invention, a method and system for routing requests for authorized approval may comprise automatically determining approvals required for authorization of a request. A valid agent to provide one of the approvals required for authorization of the request may be determined. The requests may be automatically routed to the valid agent for approval. After approval, it may be automatically determined if the approvals required for authorization of the request have been obtained.

More specifically, in accordance with the one embodiment of the present invention, the system may also comprise a decision module and a validation module. The decision module may interrogate a set of country and contract rules to determine country specific approval processing information for authorization of the application. The validation module may interrogate an approval table and limit table to determine a designated number of approvals required and designated approval level for authorization of the request.

The system may also comprise a set of country rules and a set of contract rules. In this embodiment, the decision module may interrogate the set of country rules to determine country specific approval processing information for authorization of the application. The decision module may interrogate the set of contract rules to determine contract specific approval processing information for authorization of the application.

Technical advantages of the present invention include providing an approval process which determines validation of authorization. In particular, the limit table may provide approval level and monetary limits of valid agents. Approval of a request may be validated by determining if the monetary amount of the request is within the level and monetary limits of one or more valid agents providing approval to the request. Additionally, the approval table may provide the number of approvals required for authorization of the request. Approval of the request may be validated by determining if that number of approvals have been obtained.

Another technical advantage of the present invention includes allowing the number of approvals required for authorization of a request to be altered as business processes change without having to redefine the workflow process. In particular, the approval table may include the number of approvals required for authorization of requests. The number of approvals required for authorization of a request may be altered by simply updating the approval table.

Other technical advantages of the present invention include allowing workflow to be routed differently in special circumstances. In particular, a set of country rules may specify country specific approval processing required for authorization of a request initiated in that country. Additionally, a set of contract rules may specify contract specific approval processing required for authorization of a request initiated under that contract. These rules may be interrogated during the workflow process to also provide special agent processing required for authorization of the request.

Other technical advantages of the present invention will be readily apparent to one skilled in the art from the following figures, descriptions, and claims.

BRIEF DESCRIPTION OF THE DRAWINGS

For a more complete understanding of the present invention, and its advantages thereof, reference is now made to the following description taken in conjunction with the accompanying drawings, wherein like reference numerals represent like parts, in which.

DETAILED DESCRIPTION OF THE INVENTION

Figure 1:
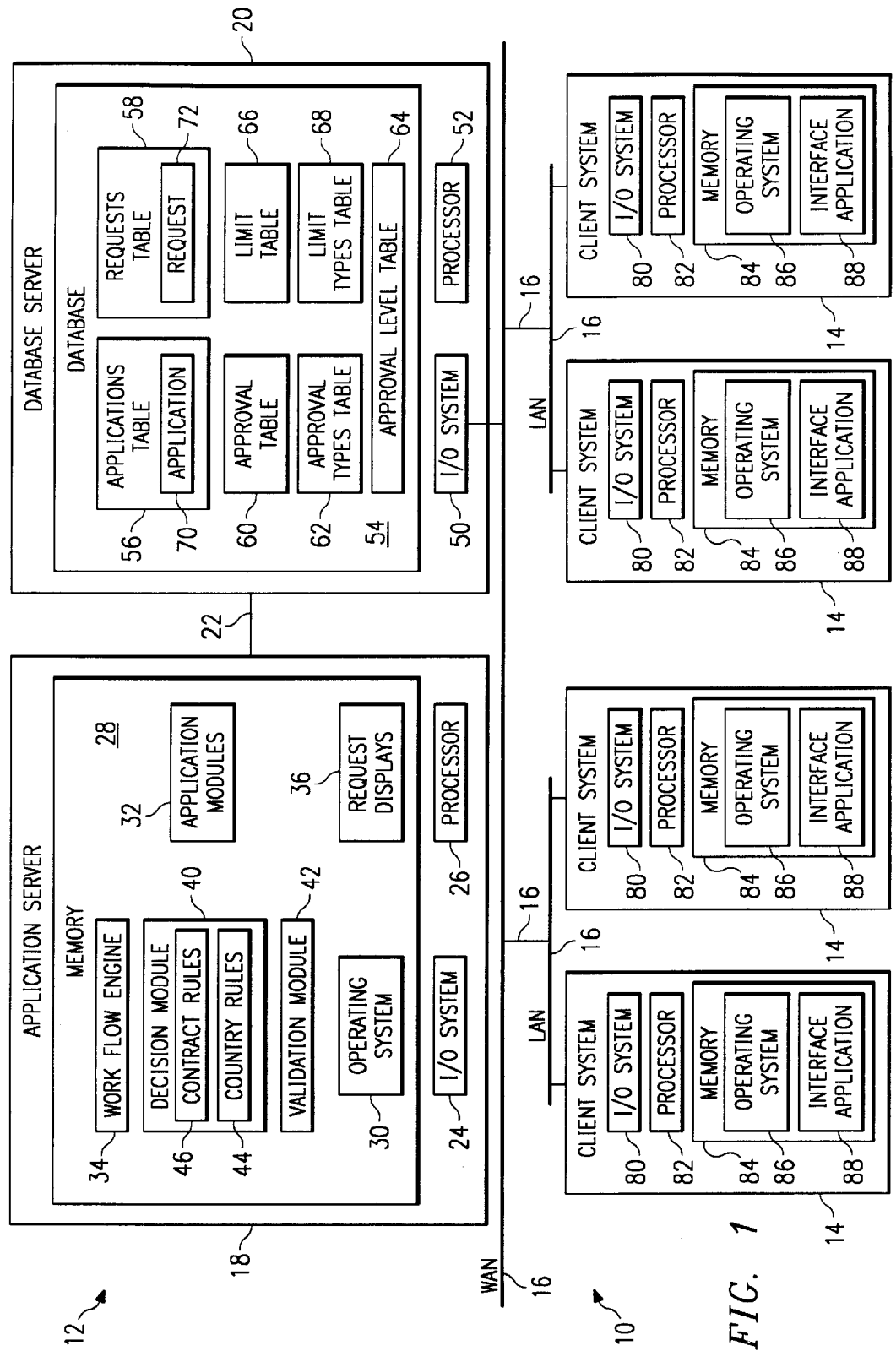
FIG. 1 is a block diagram illustrating a distributed system for routing request for authorized approval in accordance with one embodiment of the present invention.
Figure 2A:
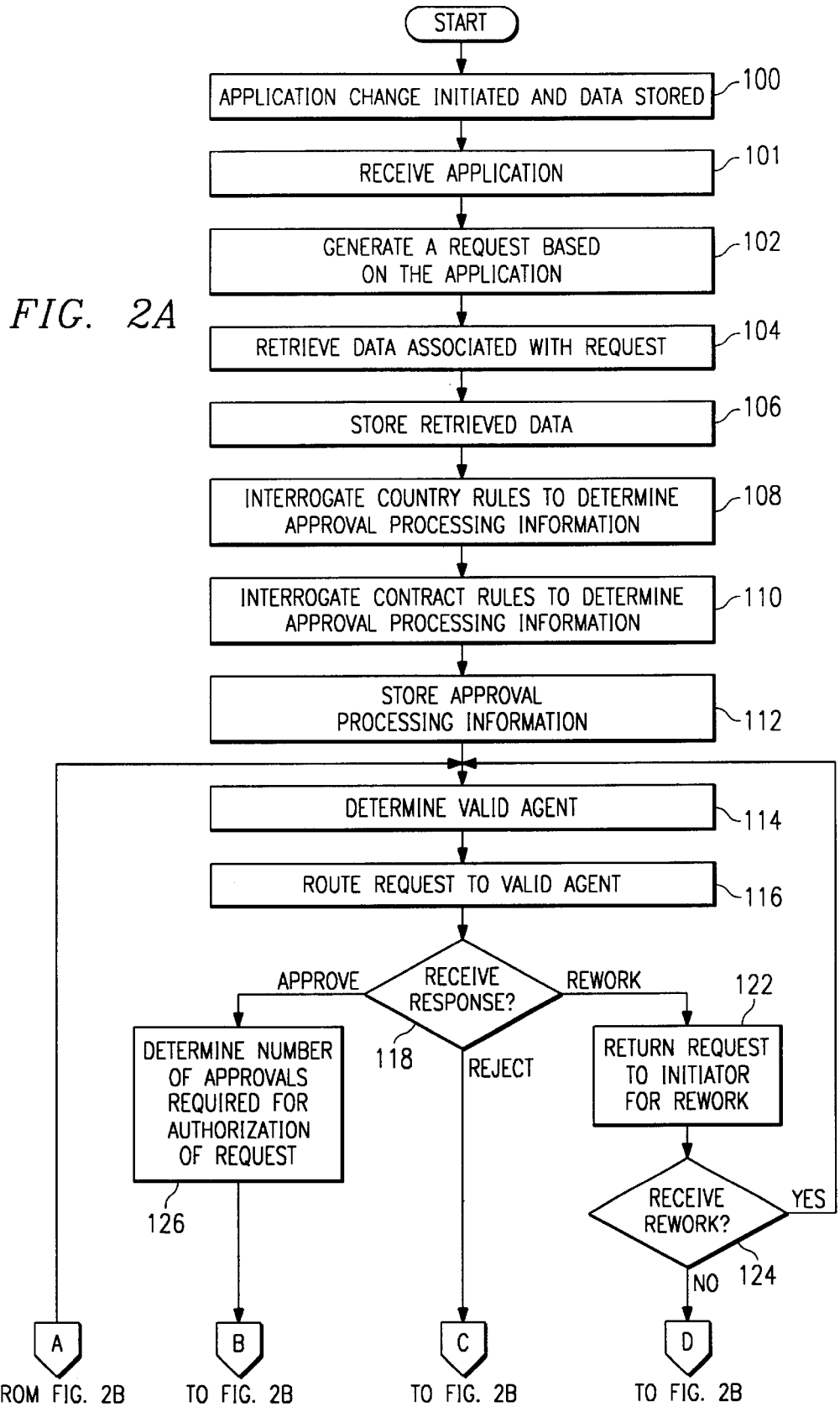
FIG. 2 is a flow diagram illustrating a method of routing requests for authorized approval in accordance with one embodiment of the present invention.
Figure 2B:
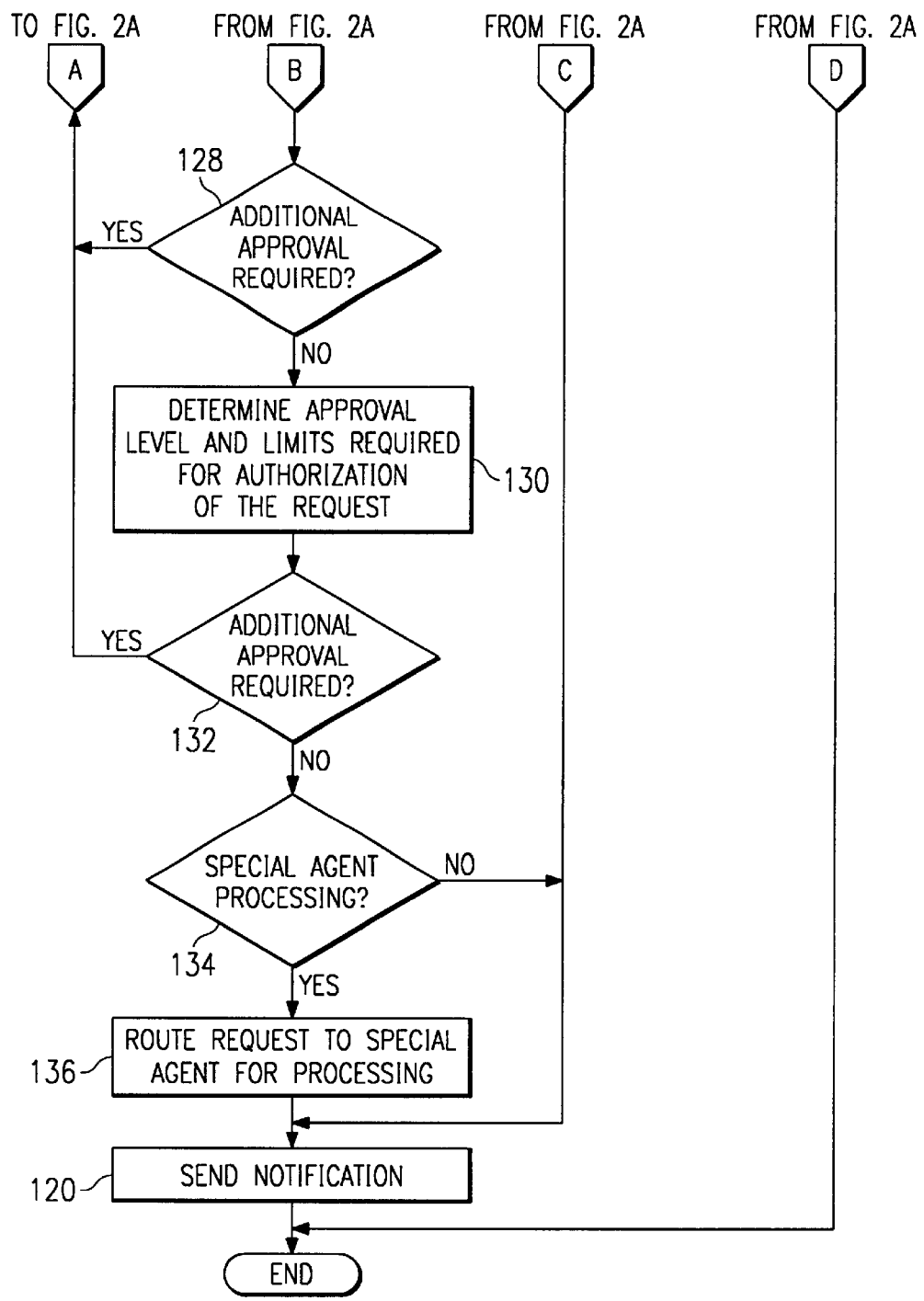

The preferred embodiments of the present invention and its advantages are best understood by referring now in more detail to FIGS. 1–2 of the drawings, in which like numerals refer to like parts. FIGS. 1–2 illustrate a method and system of routing requests for authorized approval. As described in more detail below, the method and system may validate the approval process. Additionally, the method and system may allow workflow requests to be routed differently based on special circumstances and updated without redefining the process. Accordingly, the workflow process may be efficiently maintained.

FIG. 1 is a block diagram illustrating a distributed system 10 for routing requests for authorized approval in accordance with one embodiment of the present invention. It will be understood that the system 10 may be otherwise configured within the scope of the present invention. For example, the system may operate as a stand alone system.

The distributed system 10 may comprise a server system 12 connected to a plurality of client systems 14 via a network 16. The server system 12 may be one or more computers such as a personal computer, file server, workstation, minicomputer, mainframe or any other computer capable of communicating and interconnecting with at least one other computer.

The server system 12 may comprise an application server 18 connected to a database server 20 via a network 22. The application server 18 may comprise an input/output system 24, a processor 26, and a memory 28. The input/output system 24 may connect the networks 16 and 22 and other input and output devices to the application server 18. The networks 16 and 22 may be directly connected to the application server 18 or may be connected through a data transmission device such as a modem or the like. Input devices may include a pointing device such as a mouse, a track pad, a keyboard, and the like. Output devices may include a monitor, a printer, and the like.

The application server 18 includes computer software that may be loaded into the memory 28 and executed by the processor 26. A computer software may generally be identified by modules, engines and similar systems in memory 28. It will be understood that the computer software may be otherwise combined and/or divided for processing within the scope of the present invention. Accordingly, labels of the modules and other software systems are for illustrative purposes and may be varied and still remain within the scope of the present invention.

The computer software may be loaded into memory 28 from disk storage (not shown). Disk storage may include a variety of types of storage media. For example, disk storage may include floppy disk drives, hard disk drives, CD/ROM drives, or magnetic tape drives. Memory 28 may include an operating system 30, application modules 32, workflow engine 34, and request displays 36. It will be understood that different types of operating systems may be used within the scope of the present invention.

The application modules 32 may comprise a data entry screen for each type of an application that can be initiated by a user. In one embodiment, the applications may include requests for a raise, a bonus, reimbursement of travel expenses, transfer of an employee, temporary work assignment, job code change, approval for an external hire and a purchase request. It will be understood that other types of applications may be included within the scope of the present invention. The data entry screen for each type of application preferably gathers information relevant to the submission and approval of that type of application.

The workflow engine 34 may receive an application prompt from the client systems 14 and generate requests based on the applications for approval processing. The request may correspond to the applications and be for a raise, a bonus, reimbursement of travel expenses, transfer of an employee, temporary work assignment, job code change, approval for an external hire, a purchase request and the like. It will be understood that other types of requests may be included within the scope of the present invention. The request may include some of the information submitted with the application upon which the request is based.

In one embodiment, the workflow engine 34 may comprise SAP R/3 software (Systems, Applications and Products in Data Processing) manufactured by SAP AG of Germany. It will be understood that other types of workflow engines 34 may be used within the scope of the present invention.

The workflow engine 34 may comprise a decision module 40 and a validation module 42. In one embodiment, the decision module 40 may include a set of country rules 44 and a set of contract rules 46. It will be understood that the decision module 40 may comprise disparate types of rules and still remain within the scope of the present invention. It will be further understood that the rules may be otherwise stored and still remain within the scope of the present invention.

The country rules 44 may include country specific approval processing information for authorization of a request. In one embodiment, the country specific approval processing information may include information for identifying a country, currency, cost center or other information under which the request is to be processed. It will be understood that the country rules may comprise other types of approval processing information as stored and made within the scope of the present invention. The decision module 40 may interrogate the country rules 44 to determine country specific approval processing information required for authorization of a request. For example, certain countries may require that terminations, demotions or other adverse actions be approved by a certain number of managers. Thus, the country rules 44 allow requests to be differently routed for employees in different countries.

The contract rules 46 may include contract specific approval processing information for authorization of a request. In one embodiment, the contract specific approval processing information may include information for identifying a particular contract or other information under which the request is to be processed. It will be understood that the contract rules 46 may comprise other types of contract specific approval processing information and still remain within the scope of the present invention.

The decision module 40 may interrogate the contract rules 46 to determine contracts specific approval processing information required for authorization of a request. For example, certain contracts may require that terminations, demotions, or other adverse actions be approved by a certain number of managers. Thus, the contract rules 46 allow requests to be differently routed for employees under different types of contracts.

The primary purpose of the decision module is to compile information to be validated in the validation module. In one embodiment, the validation module 42 may determine a designated number of approvals required for authorization of a request. The validation module 42 may do this by interrogating an approval table and an approval types table of the database server 20. It will be understood that the validation module 42 may otherwise determine the designated number of approvals required for authorization of a request and still remain within the scope of the present invention.

As explained in more detail below, the validation module 42 may provide validation of the approval process. In one embodiment, the validation module 42 may determine a designated approval level required for authorization of a request. The approval level may comprise a monetary limit. In this embodiment, a monetary limit may be associated with each approval level.

To determine the designated approval level required for authorization of a request, the validation module 42 may interrogate a limit table and a limit types table of the database server 20. It will be understood that the validation module 42 may otherwise determine the designated approval level required for authorization of a request and still remain within the scope of the present invention.

The request displays 36 may include displays for each type of request. Preferably, the display for each request includes data relevant to approval of the request. In one embodiment, a raise display may include information concerning the affected employee, the affected organization and the salary history of the employee. A bonus display may include information concerning the affected person and organization. A travel expense display may include information concerning the affected employee, organization and trip expenditures. An employee transfer display may include information concerning the status of the affected employee, the current organization and the requesting organization. A temporary work assignment display may include information concerning the sending organization, the requesting organization and the status of the affected employee. A job code change display may include information concerning the affected employee and organization. An external hire display may include information concerning the requested position for the external hire. A purchase request display may include information concerning the types and cost of goods and/or services. It will be understood that the request displays 36 may comprise other information and still remain within the scope of the present invention.

The database server 20 may comprise an input/output system 50, a processor 52 and a database 54. The input/output system 50 may connect the network 22 and other input and output devices to the database server 20. Input devices may include a pointing device such as a mouse, a trackpad, a keyboard, and the like. Output devices may include a monitor, a printer, and the like.

The database 54 includes computer records that may be generally identified by tables. It will be understood that the computer records may be otherwise combined and/or divided within the scope of the present invention. Accordingly, labels of the tables are for illustrative purposes and may be varied while remaining within the scope of the present invention.

The database 54 may comprise application tables 56, request tables 58, an approval table 60, an approval types table 62, an approval level table 64, a limit table 66, and a limit types table 68. The application tables 56 may comprise a plurality of applications 70 submitted by users of the client systems 14. The applications 70 may each include information keyed in by the user who initiated the application 70 change.

The requests table 58 may comprise a plurality of requests 72 generated by the workflow engine 34. Each request 72 may be based on an application 70 and include data from that associated application 70. Each request 72 may also include data associated with the request that was retrieved by the workflow engine 34, the approval status of the request 72, and the like. It will be understood that the applications 70 and requests 72 may include disparate data and still remain within the scope of the present invention. It will be further understood that the application 70 and requests 72 may be otherwise stored and still remain within the scope of the present invention.

The approval table 60 may associate each type of request with the designated number of approvals required for authorization of that request. This association may be by country. Additionally, the association may be varied depending on the client system 14 initiating the application 70 upon which the request 72 is based. It will be understood that the approval table 60 may include disparate information or be otherwise configured and still remain within the scope of the present invention.

The approval types table 62 may associate each type of request with a unique identifier. This allows storage space to be reduced, easier search capability, and maintainability in the approval table 60 and other tables including request-type information. It will be understood that the approval types table 62 may include disparate information or be otherwise configured and still remain within the scope of the present invention.

The approval level table 64 may associate each a valid agent with an approval level. Approval levels may thus be assigned by agent and not by employee. As a result, the approval level table 64 need not be updated each time an employee is promoted, demoted or otherwise repositioned within a business. Approval levels may be assigned to a position in the organization structure that is held by a user. The levels assigned would reflect a hierarchy of levels, such as A to Z, 1 to 100, or other possible values. It will be understood that the approval level table 64 may include disparate information or be otherwise configured and still remain within the scope of the present invention.

The limit table 66 may associate each approval level with a monetary limit. Each request may have to be approved by at least one agent having a monetary limit exceeding the value of the request. Generally, an agent's approval level and limit varies with the relative position of the agent. The higher the agent within a hierarchy, the higher the approval level and limit. The lower the agent within the hierarchy, the lower the approval level and limit.

The limit table 66 may associate approval levels and limits based on countries. Additionally, association may be varied depending on the client system 14 initiating the application 70 upon which the request 72 is based. It will be understood that the limit table 66 may include disparate information or be otherwise configured and still remain within the scope of the present invention.

The limit types table 68 may associate types of limits with an abbreviated identifier. This allows storage space to be reduced, easier search capability, and maintainability in the limit table 66 and other tables including limit-type information. It will be understood that the limits type table 68 may include disparate information or be otherwise configured and still remain within the scope of the present invention.

The client system 14 may be similar to the server system 12 and may be implemented using virtually any type of computer. Thus, the client system 14 may be a personal computer, file server, workstation, minicomputer, mainframe, or any other computer capable of communicating and interacting with other computers.

The client systems 14 may each comprise an input/output system 80, a processor 82, and a memory 84. The input/output system 80 may connect the network 16 and other input and output devices to the client system 14. The network 16 may be directly connected to the client system 14 or may be connected through a data transmission device such as a modem or the like. Input devices may include a pointing device such as a mouse, a track pad, a keyboard, or the like. Output devices may include a monitor, a printer, or the like.

The client system 14 includes computer software that may be loaded into memory 84 and executed by the processor 82.

The computer software may generally be identified by modules and similar systems in memory 84. It will be understood that the computer software may be otherwise combined and/or divided for processing within the scope of the present invention. Accordingly, labels of the modules or other software systems are for illustrative purposes and may be varied within the scope of the present invention.

Computer software may be loaded into memory 84 from disk storage (not shown). As previously described in connection with the server system 12, disk storage may include a variety of types of storage media such as floppy disk drives, hard disk drives, CD/ROM drives, or magnetic tape drives.

Memory 84 may include an operating system 86 and an interface application 88. In one embodiment, the operating system 86 may include a graphical user interface (GUI). In this embodiment, the operating system 86 may be Macintosh OS, WINDOWS NT, WINDOWS 95, OS/2, or any other type of graphic or operating system. It will be understood that other types of operating systems, including non-graphic operating systems, may be used within the scope of the present invention.

The interface application 88 may connect to the server system 12 via the network 16 and access the workflow engine 34. As previously described in connection with the server system 12, the client system 14 may submit applications 70 to the workflow engine 34 for processing. The applications 70 may be stored in the applications table 56 of the database server 20. As described in more detail below, the workflow engine 34 may notify a client system 14 of approval, rejection or rework responses to a request 72 based on an application 70 submitted by that client system 14. It will be understood that the client system 14 and workflow engine 34 may otherwise communicate and still remain within the scope of the present invention.

The networks 16 and 22 may be any type of communication link capable of supporting data transfer.

The networks 16 and 22 may be a Local Area Network (LAN), a Wide Area Network (WAN), combination network, or the like. It will be understood that the networks 16 and 22 may comprise other types of communication links within the scope of the present invention.

FIG. 2 is a flow diagram illustrating a method of routing a request for authorized approval in accordance with one embodiment of the present invention. The method begins at step 100 wherein an application change is initiated. In one embodiment, the application 70 may comprise a data entry screen and relevant data keyed in by the user initiating the application change. As previously described, the data entry screen may be accessed from the application modules 32 of the application server 18. Next, at step 101, the application 70 may be received by the application server 18 upon submission of the application 70 by the user.

Proceeding to step 102, the workflow engine 34 of the application server 18 may generate a request 72 associated with the application 70. In one embodiment, the request 72 may comprise selected data of the application 70. Additionally, the request 72 may be especially formatted for processing in connection with the workflow engine 34. It will be understood that the request 72 may be received directly from the client system 14. In this embodiment, the application 70 and request 72 may be one and the same.

Next, at step 104, the workflow engine 52 may retrieve data associated with the request 72. The associated data may be data relevant to processing and/or approval of the request 72. At step 106, the associated data may be stored with the request 72 in the request table 58. It will be understood that the associated data may be otherwise stored within the scope of the present invention.

Proceeding to step 108, the decision module 40 may interrogate the country rules 44 to determine country specific approval processing information required for authorization of the request 72. Such processing information may include the country, currency, cost center, and the like of the request 72. At step 110, the decision module 40 may interrogate the contract rules 46 to determine contract specific approval processing information required for authorization of the request 72. Such processing information may include the contract and the like of the request 72. At step 112, the approval processing information obtained at steps 108 and 110 may be stored with the request 72 in the requests table 58. It will be understood that the approval processing information may be otherwise stored within the scope of the present invention.

At step 114, the workflow engine 34 may identify a valid agent. A valid agent may be an agent able to provide one of the approvals required for authorization of the request. Thus, each valid agent need not necessarily meet the level and/or limit required for authorization of the request 72. In one embodiment, the valid agent may be determined by interrogating the associated data and the approval processing information retrieved by the workflow engine 34. As previously described, the associated data and the approval processing information may be stored with the request 72 in the request table 58.

The valid agent may provide an approval to the request 72. In a first instance, the valid agent may be an immediate manager of the user who initiated the application 70. It will be understood that valid agents able to provide approval to the request may vary within the scope of the present invention.

Proceeding to step 116, the workflow engine 34 may route the request 72 to the identified valid agent for approval. Next, at decisional step 118, the workflow engine 34 may receive a response from the valid agent to whom the request 72 was routed. If the valid agent rejects the request 72, the "REJECT" branch of decisional step 118 leads to step 120. At step 120, the user who initiated the application 70 upon which the request 72 is based is notified of the status of the request 72. In this instance, the workflow engine 34 may notify the user that the request 72 has been rejected. It will be understood that the workflow engine 34 may otherwise notify the user initiating the request 72 within the scope of the present invention.

Returning to decisional step 118, if the valid agent requires that the request 72 be reworked, the "REWORK" branch of decisional step 118 leads to step 122. At step 122, the workflow engine 34 may return the request 72 to the user who initiated the application 70 upon which the request 72 is based for rework. It will be understood that the workflow engine 34 may also or alternatively return the application 70 to the user for rework within the scope of the present invention.

Proceeding to decisional step 124, if the reworked request 72 is resubmitted by the user, the "YES" branch of decisional step 124 may return to step 114 wherein the workflow engine 34 determines a valid agent for approval of the reworked request 72. In this instance, the workflow engine 34 may route the reworked request 72 back to the previous agent that requested the rework. If the workflow engine 34 does not receive rework from the user, the "NO" branch of decisional step 124 leads to the end of the process.

Returning to decisional step 118, if the valid agent approves the request 72, the "APPROVE" branch of decisional step 118 leads to step 126. At step 126, the validation module 42 may determine a designated number of approvals required for authorization of the request 72. In one embodiment, validation module 42 may interrogate the approval table 60 and the approval types table 62 to determine the number of approvals required for authorization of the request 72. It will be understood that the number of approvals required for authorization of the request 72 may be otherwise determined within the scope of the present invention.

Next, at decisional step 128, the decision module 40 may determine if additional approvals are required for authorization of the request 72. In one embodiment, the decision module 40 may determine if additional approvals are required by comparing a designated number of approvals required for authorization of the request 72 that is determined at step 126 to the number of approvals obtained. The number of approvals obtained may be stored with the request 72 in the request table 58 of the database 54. It will be understood that the number of approvals obtained may be otherwise determined and/or stored within the scope of the present invention.

At decisional step 128, if additional approvals are required for authorization of the request 72, the "YES" branch of decisional step 128 returns to step 114 wherein the workflow engine 34 determines a valid agent to provide an additional approval to the request 72. In this instance, the valid agent may be a next agent, such as a manager of the manager who previously approved the request 72. If additional approvals are not required, the "NO" branch of decisional step 128 leads to step 130.

At step 130, the validation module 42 may determine a designated approval level required for authorization of the request 72. In one embodiment, the approval level required for authorization of the request 72 may be a monetary limit. In this embodiment, the monetary limit may be stored with the request 72 in the requests table 58. It will be understood that the approval level may be otherwise obtained within the scope of the present invention. For example, the approval level required for authorization of the request 72 may be stored in a table of the database 54.

Next, at decisional step 132, the validation module 42 may determine if an additional approval is required to meet the approval level required for authorization of the requests 72. In one embodiment, the validation module 42 may determine if an additional approval is required by comparing the monetary limit required for authorization of a request 72 that was determined at step 130 to the monetary limit of one or more of the valid agents providing approval to the request 72. As previously described, the level and/or limits of the valid agents may be obtained by interrogating the approval level table 64, limit table 66 and limit types table 68. It will be understood that the level and/or limits of the approving valid agents may be otherwise determined within the scope of the present invention.

At decisional step 132, if additional approvals are required, the "YES" branch of decisional step 132 returns to step 114 wherein the workflow engine 34 determines a valid agent to provide an additional approval to the request 72. As previously described, in such an instance, the agent may be a manager of the manager who previously approved the request 72. If additional approvals are not required, the "NO" branch of decisional step 132 leads to decisional step 134.

At decisional step 134, the workflow engine 34 may determine if special agent processing is required for authorization of the requests 72. Special agent processing may be required by the country or contract specific rules 44 and 46. If special agent processing is required, the "YES" branch of decisional step 134 leads to step 136. At step 136, the workflow engine 34 may route the request to the special agent processing. Such special agent processing may vary depending on the country and/or contract under which the application 70 upon which the request 72 is based was initiated. For example, the special agent processing may entail an additional approval, notification or other action. If additional approval is required, the request may be approved, rejected or returned for rework by the special agent and appropriately routed as previously described in connection with the valid agent.

Step 136 leads to step 120. Returning to decisional step 134, if special agent processing is not required, the "NO" branch of decisional step 134 also leads to step 120. As previously described, at step 120, the workflow engine 34 may notify the user who initiated the application 70 upon which the request 72 is based of the status of the request 72. In this instance, workflow engine 34 may notify the user that the request 72 has been approved. It will be understood that the workflow engine 34 may otherwise notify the user initiating the request 72 within the scope of the present invention.

Although the present invention has been described with several embodiments, various changes and modifications may be suggested to one skilled in the art. It is intended that the present invention encompass such changes and modifications as falls within the scope of the appended claims.

What is claimed is:

1. An automated method for authorized approval processing, comprising the steps of:
   receiving from a user a request for approval;
   in response to receiving the request, automatically determining a type of the request;
   automatically determining a designated number of approvals required for authorization of the request based on the type of the request;
   automatically determining a valid agent to provide one of the designated number of approvals required for authorization of the request;
   automatically routing the request to the valid agent for the approval; and
   automatically determining if the designated number of approvals required for authorization of the request have been obtained.

2. The automated method of claim 1, further comprising:
   if the designated number of approvals required for authorization of the request has not been obtained, automatically determining a next valid agent to provide one of the designated number of approvals required for authorization of the request; and
   automatically routine the request to the next valid agent for the approval.

3. The automated method of claim 1, further comprising:
   automatically determining an approval level required for authorization of the request based on the type of the request;
   automatically determining if the approval level required for authorization of the request has been obtained;
   if the approval level required for authorization of the request has not been obtained, automatically determining a next valid agent to provide the level of approval required for authorization of the request; and automatically routing the request to the next valid agent.

4. An automated method of claim 3, the approval level comprising monetary limit.

5. The automated method of claim 1, wherein automatically determining the valid agent comprises automatically determining a position of the user in a hierarchy and determining the valid agent based on the position of the user in the hierarchy.

6. The automated method of claim 5, wherein determining the valid agent based on the position of the user in the hierarchy comprises determining a manager of a user for the position.

7. The automated method of claim 1, further comprising:

automatically determining if country specific approval processing is required for authorization of the request based on the type of the request; and automatically interrogating a set of country rules to determine country specific approval processing information for authorization of the request if country specific approval processing is required.

8. The automated method of claim 7, wherein automatically interrogating the set of country rules comprises automatically determining country specific approvals required for authorization of the request.

9. The automated method of claim 1, further comprising:

automatically determining if contract specific approval processing is required for authorization of the request based on the type of the request; and automatically interrogating a set of contract rules to determine contract specific approval processing information for authorization of the request if contract specific approval processing is required.

10. The automated method of claim 9, wherein automatically interrogating the set of contract rules comprises automatically determining contract specific approvals required for authorization of the request.

11. The method of claim 10, wherein automatically interrogating the set of contract rules comprises automatically determining if special agent processing is required for authorization of the request.

12. The automated method of claim 1, further comprising the steps of:

automatically retrieving data associated with the request based on the type of the request; and automatically storing the associated data with the request.

13. The automated method of claim 1, receiving the request further comprising the steps of:

receiving a prompt in a work flow engine from an application; and generating the request for authorized approval based on the data entered into the application by the user.

14. The automated method of claim 1, further comprising the steps of:

automatically determining if special agent processing is required for authorization of the request based on the type of the request; and if special agent processing is required for authorization of the request, automatically determining a special agent for approval of the request.

15. The method of claim 14, further comprising automatically routing the request to the special agent for approval of the request.

16. An automated method for authorized approval processing, comprising the steps of:

receiving from a user a request for approval;

automatically determining a type of the request;

automatically interrogating a set of rules based on the type of the request, to determine approval processing information for authorization of the request; and automatically routing the request in accordance with the approval processing information for authorization of the request.

17. The automated method of claim 16, wherein the rules comprise a set of country rules.

18. The automated method of claim 16, wherein the set of rules comprise a set of contract rules.

19. A system for authorized approval processing, comprising;

a workflow engine operable to receive from a user a request for authorization, the workflow engine further operable to determine a type of the request;

a validation module operable to determine a designated number of approvals required for authorization of the request based on the type of the request;

the workflow engine operable to automatically determine a valid agent to provide one of the designated number of approvals required for authorization of the request; and the workflow engine operable to automatically route the request to the valid agent for the approval.

20. The system of claim 19, further comprising a decision module operable to determine if country specific approval processing is required for the type of the request.

21. The system of claim 20, wherein the decision module is further operable to determine if special agent processing is required for the type of the request.

22. The system of claim 21, wherein the validation module is further operable to determine a special agent for approval of the request if special agent processing is required.

23. The system of claim 19, wherein the validation module is further operable to determine a designated approval level for authorization of the request, the validation module operable to determine if the approval level has been obtained.

* * * * *